(12) United States Patent
Ito (10) Patent No.: US 11,722,611 B2
(45) Date of Patent: Aug. 8, 2023

(54) IMAGE FORMING SYSTEM CAPABLE OF REMOTELY OPERATING IMAGE FORMING APPARATUS, IMAGE FORMING APPARATUS, AND REMOTE OPERATION PROGRAM

(71) Applicant: KYOCERA Document Solutions Inc., Osaka (JP)

(72) Inventor: Satoshi Ito, Osaka (JP)

(73) Assignee: KYOCERA Donment Solutions Inc., Osaka (JP)

( * ) Notice: Subject to any disclaimer, the term of this patent is extended or adjusted under 35 U.S.C. 154(b) by 0 days.

(21) Appl. No.: 17/867,564

(22) Filed: Jul. 18, 2022

(65) Prior Publication Data
US 2023/0022319 A1    Jan. 26, 2023

(30) Foreign Application Priority Data
Jul. 20, 2021    (JP) .................................. 2021-120053

(51) Int. Cl.
*H04N 1/00* (2006.01)
(52) U.S. Cl.
CPC ....... *H04N 1/00411* (2013.01); *H04N 1/0097* (2013.01); *H04N 1/00129* (2013.01); *H04N 1/00204* (2013.01); *H04N 1/00251* (2013.01); *H04N 2201/0075* (2013.01)

(58) Field of Classification Search
None
See application file for complete search history.

(56) References Cited

U.S. PATENT DOCUMENTS

2017/0318168 A1*  11/2017  Toyamasaki ....... H04N 1/00456
2018/0275403 A1*   9/2018  Sawa ................. H04N 1/00411

FOREIGN PATENT DOCUMENTS

JP        2018158485 A     10/2018

* cited by examiner

*Primary Examiner* — Andrew H Lam
(74) *Attorney, Agent, or Firm* — Alleman Hall Creasman & Tuttle LLP (57) ABSTRACT

An image forming system includes a mobile terminal apparatus and an image forming apparatus. The mobile terminal apparatus displays a captured image of an operation panel of the image forming apparatus, extracts from the captured image, in response to a user operation on the captured image, an operation partial image including an operation part designated by the user operation, and transmits operation partial image data indicating the operation partial image to the image forming apparatus. The image forming apparatus identifies the operation part corresponding to the operation partial image data received from the mobile terminal apparatus, and executes an action corresponding to the identified operation part.

2 Claims, 7 Drawing Sheets

IMAGE FORMING SYSTEM CAPABLE OF REMOTELY OPERATING IMAGE FORMING APPARATUS, IMAGE FORMING APPARATUS, AND REMOTE OPERATION PROGRAM

INCORPORATION BY REFERENCE

This application is based upon and claims the benefit of priority from the corresponding Japanese Patent Application No. 2021-120053 filed on Jul. 20, 2021, the entire contents of which are incorporated herein by reference.

BACKGROUND

The present disclosure relates to an image forming system, an image forming apparatus, and a remote operation program.

In a system, a mobile terminal apparatus (a) captures an image of an operation panel of an image forming apparatus and displays the captured image, (b) detects a user operation on the captured image of the operation panel, (c) generates an action command corresponding to the user operation, and (d) transmits the generated command to the image forming apparatus. Upon receiving the action command, the image forming apparatus performs an action designated by the action command.

SUMMARY

An image forming system according to the present disclosure includes: an image forming apparatus including an operation panel; and a mobile terminal apparatus capable of communicating with the image forming apparatus. The mobile terminal apparatus (a) captures an image of the operation panel of the image forming apparatus to generate a captured image, (b) displays the captured image, (c) detects a user operation on the captured image, (d) identifies a position of the user operation on the captured image, (e) extracts, from the captured image, a partial image of a specific range including the position on the captured image as an operation partial image, and (f) transmits operation partial image data indicating the operation partial image to the image forming apparatus. The image forming apparatus (a) receives the operation partial image data from the mobile terminal apparatus, (b) identifies an operation part on the operation panel corresponding to the operation partial image indicated by the operation partial image data, and (c) executes an action corresponding to the identified operation part.

An image forming apparatus according to the present disclosure includes a communication device capable of communicating with a mobile terminal apparatus of a user; an internal device; and a remote operation processing portion. The remote operation processing portion (a) receives operation partial image data from the mobile terminal apparatus by means of the communication device, (b) identifies an operation part on an operation panel corresponding to an operation partial image indicated by the operation partial image data, and (c) executes an action corresponding to the identified operation part by means of the internal device. Here, the operation partial image data is image data indicating a partial image of a specific range including a detection position of a user operation on a captured image, the partial image being extracted from the captured image generated by the mobile terminal apparatus capturing an image of the operation panel of the image forming apparatus.

A remote operation program according to the present disclosure causes a computer in a mobile terminal apparatus including an image capturing device, a display device, an input device, and a wireless communication device to function as: an imaging processing portion configured to (a) capture, by the image capturing device, an image of an operation panel of an image forming apparatus to generate a captured image and (b) display the captured image by the display device; and an operation information transmitting portion configured to (a) detect, by the input device, a user operation on the captured image, (b) identify a position of the user operation on the captured image, (c) extract, from the captured image, a partial image of a specific range including the position on the captured image as an operation partial image, and (f) transmit, by the wireless communication device, operation partial image data indicating the operation partial image to the image forming apparatus.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

An embodiment of the present disclosure will be described below with reference to the drawings.

Figure 1:
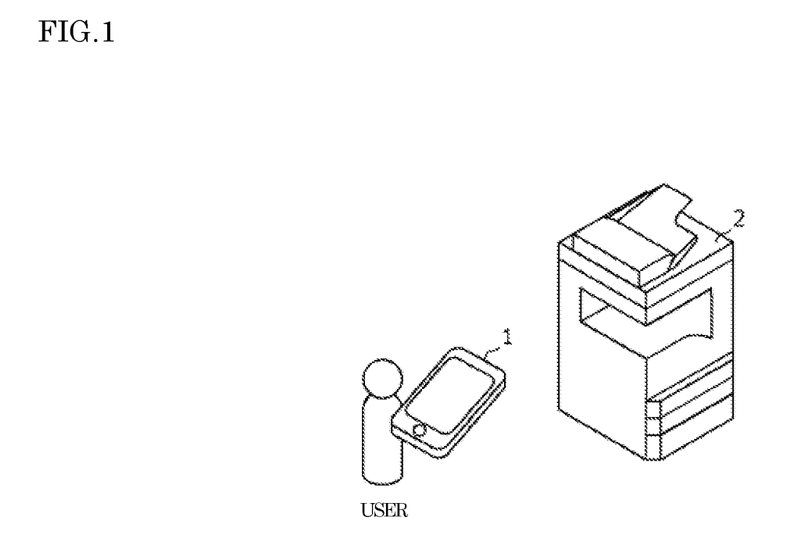
FIG. 1 shows a configuration of an image forming system according to an embodiment of the present disclosure.

FIG. 1 shows a configuration of an image forming system according to an embodiment of the present disclosure.

In the system shown in FIG. 1, a mobile terminal apparatus 1, such as a smartphone or a tablet PC, is carried by a user who uses an image forming apparatus 2. The mobile terminal apparatus 1 and the image forming apparatus 2 can communicate with each other through wireless communication or the like. It is noted that, in this system, each of a plurality of users has a mobile terminal apparatus 1, and can use the image forming apparatus 2 by means of the mobile terminal apparatus 1.

Figure 2:
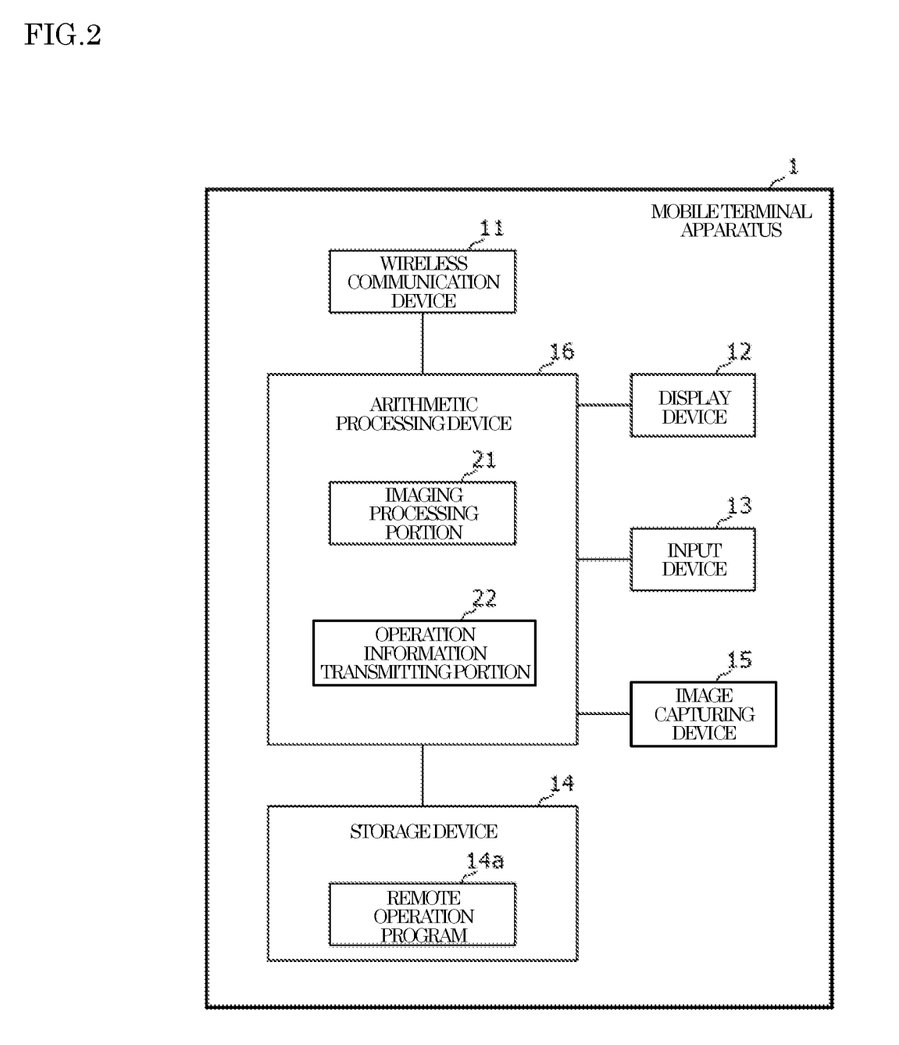
FIG. 2 is a block diagram showing a configuration of a mobile terminal apparatus 1 in FIG. 1.

FIG. 2 is a block diagram showing a configuration of the mobile terminal apparatus 1 in FIG. 1. As shown in FIG. 2, the mobile terminal apparatus 1 includes a wireless communication device 11, a display device 12, an input device 13, a storage device 14, an image capturing device 15, and an arithmetic processing device 16.

The wireless communication device 11 is a communication circuit of a predetermined wireless communication standard. The wireless communication device 11 is a wireless LAN interface, a short-range wireless communication device of Bluetooth or the like, or a mobile phone network interface (an RF interface, a baseband portion, etc.).

The display device 12 is a device such as a liquid crystal display disposed in a housing of the mobile terminal apparatus 1, and displays various screens to the user. The input device 13 is a device that detects a user operation, and includes a touch panel, hard keys, and the like disposed on the display device 12. The storage device 14 is a nonvolatile storage device such as a flash memory, and stores programs and data. The image capturing device 15 includes an image sensor and an optical system that forms an image of light from a subject on the image sensor, and generates image data of a captured image.

The arithmetic processing device 16 is a computer including a central processing unit (CPU), a read only memory (ROM), a random access memory (RAM), and the like, and loads programs from the storage device 14 or the ROM into the RAM and executes the programs to operate as various processing portions. In this embodiment, the arithmetic processing device 16 executes a remote operation program 14a stored in the storage device 14 to operate as an imaging processing portion 21 and an operation information transmitting portion 22.

The imaging processing portion 21 captures, by the image capturing device 15, an image of an operation panel 32 of the image forming apparatus 2 to generate a captured image, and (b) displays the captured image by the display device 12.

Specifically, the imaging processing portion 21 causes the image capturing device 15 to start capturing an image in accordance with a user operation on the input device 13, repeats capturing an image in real time, acquires image data of a captured image (a rectangular image obtained in the field of view of the optical system of the image capturing device 15), and displays a captured image based on the image data on the display device 12.

In one system, the mobile terminal apparatus 1 (a) captures an image of the operation panel 32 of the image forming apparatus 2 and displays the captured image, (b) detects a user operation on the captured image of the operation panel 32, (c) generates an action command corresponding to the user operation, and (d) transmits the generated command to the image forming apparatus 2. Upon receiving the action command, the image forming apparatus 2 performs an action designated by the action command.

However, in the above-described system, in order to generate an action command, the mobile terminal apparatus 1 needs to hold in advance layout information of the operation panel 32 of the image forming apparatus 2 (information such as the position of an operation screen and the positions and sizes of operation keys) as layout data.

In general, the layout of the operation panel 32 of the image forming apparatus 2 varies depending on the model of the apparatus. Therefore, the mobile terminal apparatus 1 needs to hold in advance different layout data for each model of the image forming apparatus 2. Installation of the layout data in the mobile terminal apparatus 1 is required for each model of the image forming apparatus 2, which is inconvenient for the user.

On the other hand, in the image forming system according to the embodiment of the present disclosure, the user can cause the image forming apparatus 2 to perform a desired operation by means of the mobile terminal apparatus 1 regardless of the model of the image forming apparatus 2, as will be described below.

The operation information transmitting portion 22 (a) detects, by the input device 13, a user operation on a captured image, (b) identifies a position of the user operation on the captured image, (c) extracts, from the captured image, a partial image of a specific range including the position on the captured image (here, a rectangular area of a predetermined size centered on a detection position of the user operation on the captured image) as an operation partial image, and (f) transmits, by the wireless communication device 11, operation partial image data indicating the operation partial image to the image forming apparatus 2.

Specifically, when detecting, by the input device 13 (for example, a touch panel), a predetermined user operation (such as a touch) on a captured image at a certain point in time, the operation information transmitting portion 22 identifies a captured image (still image) at that point in time and identifies the position of the user operation on the captured image.

Figure 3:
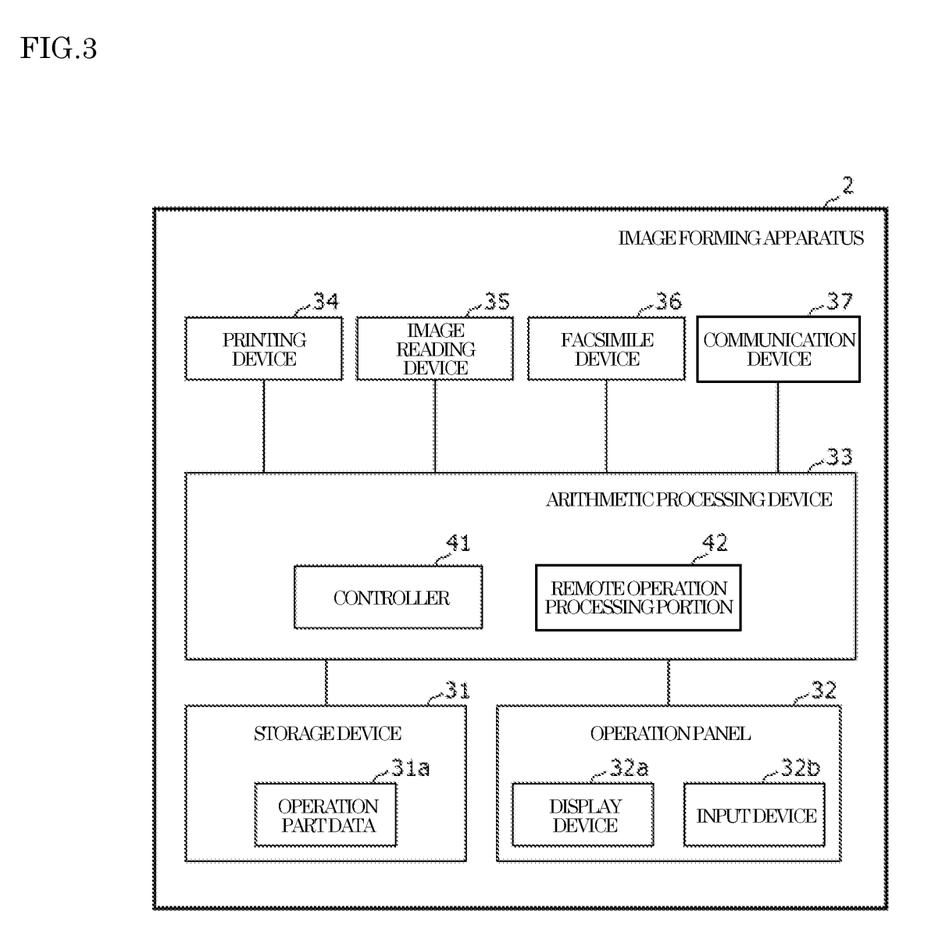
FIG. 3 is a block diagram showing a configuration of the image forming apparatus 2 in FIG. 1.

FIG. 3 is a block diagram showing a configuration of the image forming apparatus 2 in FIG. 1. As shown in FIG. 3, the image forming apparatus 2 includes a storage device 31, an operation panel 32, an arithmetic processing device 33, a printing device 34, an image reading device 35, a facsimile device 36, and a communication device 37.

The storage device 31 is a nonvolatile rewritable storage device such as a flash memory. Operation part data 31a to be described later is stored in advance in the storage device 31. The operation part data 31a is data indicating one or more operation parts on the operation panel 32 of the image forming apparatus 2.

The operation panel 32 is disposed on the front side of the upper surface of the housing, and includes a display device 32a such as a liquid crystal display and an input device 32b such as hard keys or a touch panel. The display device 32a displays various screens for the user. Soft keys are realized by key images displayed on the display device 32a and a touch panel. The input device 32b receives a user operation on the hard keys or the soft keys.

Figure 4:
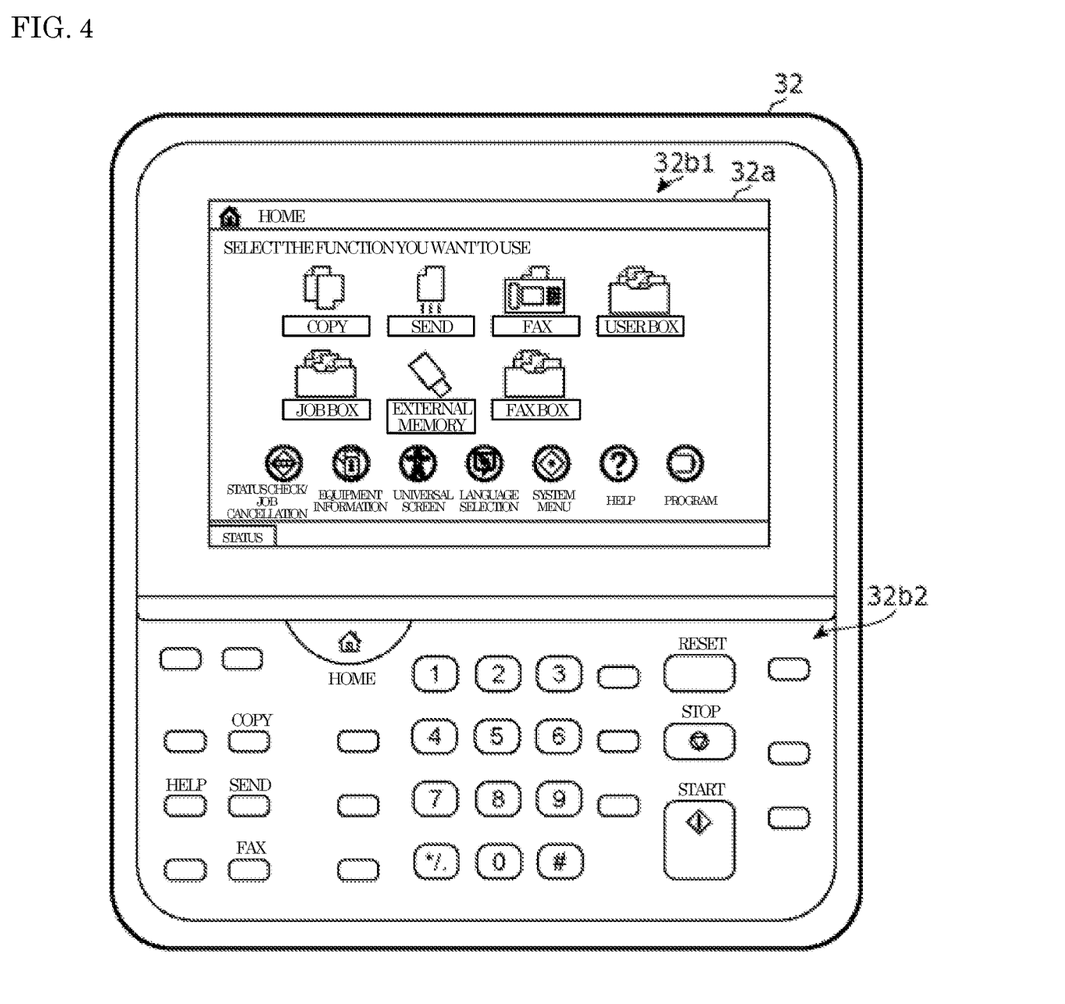
FIG. 4 shows an example of an operation panel 32 of the image forming apparatus 2 in FIG. 1 and FIG. 3.
Figure 5:
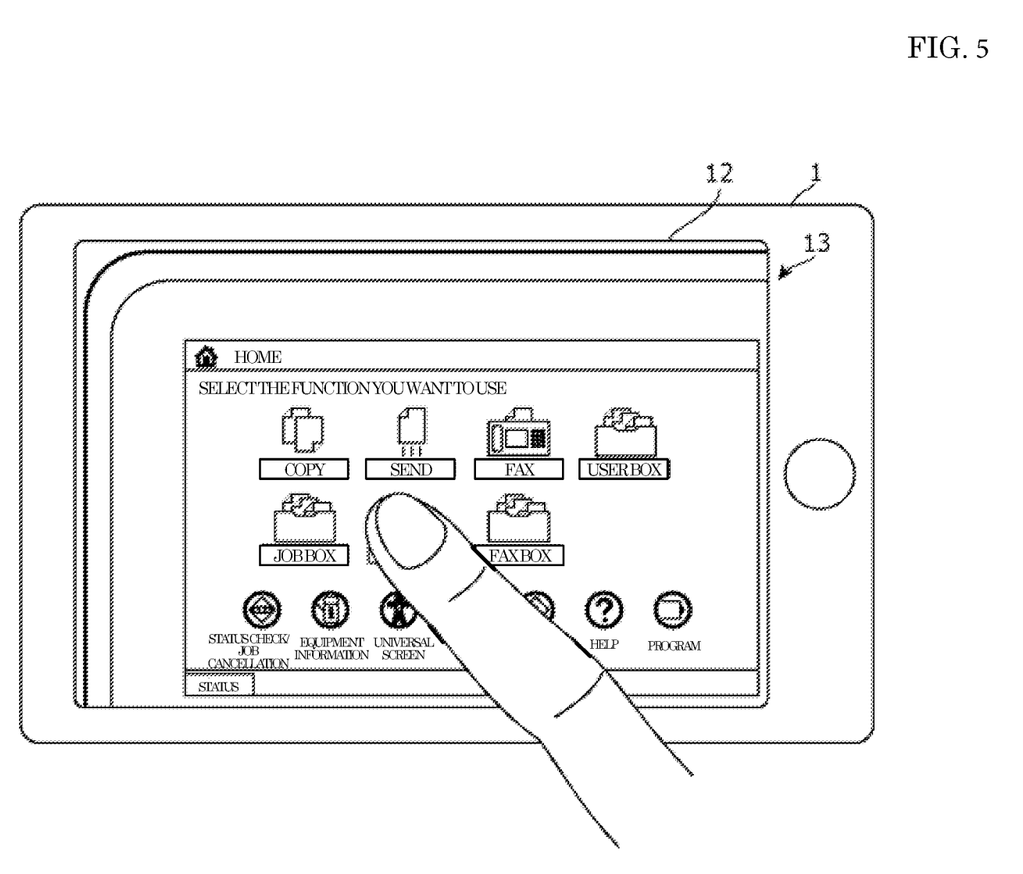
FIG. 5 shows an example of the mobile terminal apparatus 1 displaying a captured image of the operation panel 32 shown in FIG. 4.
Figure 6:
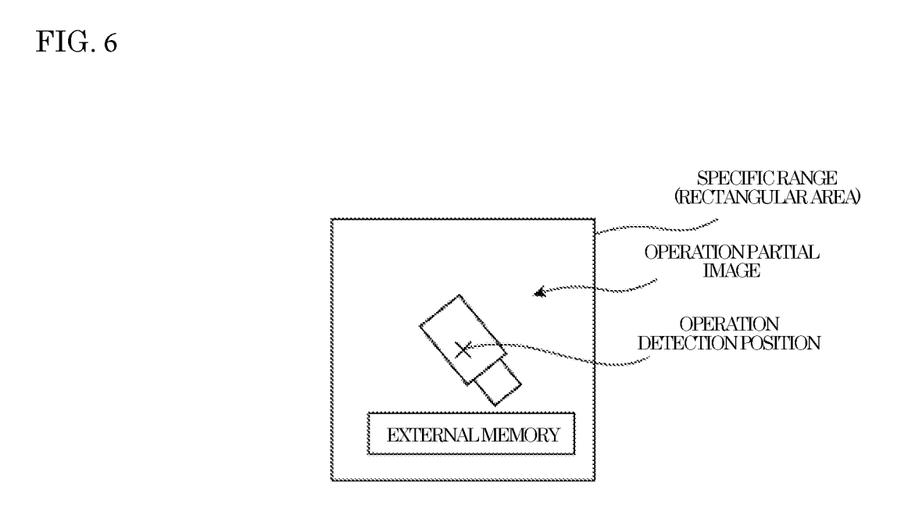
FIG. 6 shows an example of an operation partial image extracted from a captured image of the operation panel 32 shown in FIG. 4.

FIG. 4 shows an example of the operation panel 32 of the image forming apparatus 2 in FIG. 1 and FIG. 3. FIG. 5 shows an example of the mobile terminal apparatus 1 displaying a captured image of the operation panel 32. FIG. 6 shows an example of an operation partial image extracted from a captured image of the operation panel 32. As shown in FIG. 4 for example, the operation panel 32 includes, as the input device 32b, a touch panel 32b1 that causes icon images to function as soft keys, and hard keys 32b2. The mobile terminal apparatus 1 captures an image of the operation panel 32 by means of the image capturing device 15 in accordance with a predetermined user operation, and displays the captured image on the display device 12 as shown in, for example, FIG. 5. When the user presses a position in a captured image during display of the captured image, the mobile terminal apparatus 1 detects the press by the touch panel and identifies an operation image (still image) that was displayed at the time of detection of the user operation. In addition, the mobile terminal apparatus 1 extracts an operation partial image including a position where the user operation (press) was detected, as shown in FIG. 6 for example, and transmits operation partial image data indicating the extracted operation partial image to the image forming apparatus 2.

Returning to FIG. 3, the arithmetic processing device 33 is a computer having a CPU, a ROM, and a RAM, and operates as various processing portions by loading programs stored in the ROM or a storage device (not shown) into the RAM and executing the programs by the CPU. The arithmetic processing device 33 operates as a controller 41 and a remote operation processing portion 42.

The printing device 34 is an internal device that prints a document sheet image or the like on a print sheet based on image data. Specifically, the printing device 34 outputs a print product obtained by printing a document sheet image designated by a print request of the user. In addition, the image reading device 35 is an internal device that optically reads a document sheet image from a document sheet and generates image data of the document sheet image. The facsimile device 36 is an internal device that generates a facsimile signal of a document sheet image or the like based on image data and transmits the facsimile signal, and also receives a facsimile signal from outside and generates image data from the facsimile signal. The communication device 37 is an internal device, such as a wireless or wired network interface, a short-range wireless communication device, or the like, that performs data communication with the mobile terminal apparatus 1 directly or indirectly via a network.

The controller 41 controls internal devices such as the printing device 34, the image reading device 35, the facsimile device 36, and the communication device 37 to execute various kinds of processing.

The remote operation processing portion 42 (a) receives the above-described operation partial image data from the mobile terminal apparatus 1 by means of the communication device 37, (b) identifies an operation part (a hard key, a soft key, or the like remotely operated by the user by means of the mobile terminal apparatus 1) on the operation panel 32 corresponding to an operation partial image indicated by the operation partial image data, and (c) causes the controller 41 to execute an action corresponding to the identified operation part by means of the above-described internal devices.

For example, the remote operation processing portion 42 detects, by an existing pattern matching method, an image pattern of each operation part indicated by operation part data 31a on an operation partial image indicated by operation partial image data. Then, the remote operation processing portion 42 detects the operation part whose image pattern is detected on the operation partial image as an operation part indirectly operated by the user.

In addition, for example, the remote operation processing portion 42 may derive features of both the operation partial image indicated by the operation partial image data and the image of each operation part indicated by the operation part data 31a by an existing method, compare the features of both images, and identify an operation part corresponding to the operation partial image indicated by the operation partial image data based on the comparison result. For example, the features for hard keys and soft keys as operation parts include the shape and color of the key, the character (including the symbol) in the key, and the character color. It is noted that characters are converted into character codes by image recognition processing and compared.

Figure 7:
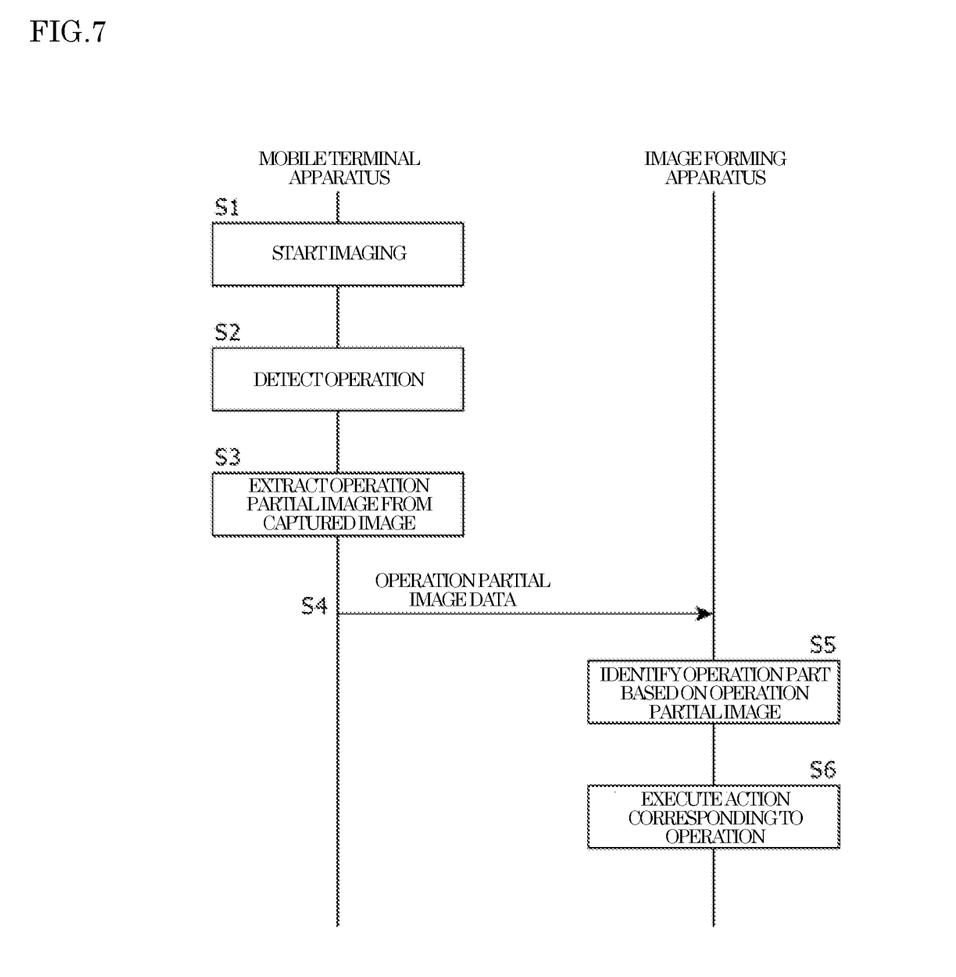
FIG. 7 is a sequence diagram illustrating an action of the image forming system shown in FIG. 1.

Next, an operation of the above-described image forming system will be described. FIG. 7 is a sequence diagram illustrating an operation of the image forming system shown in FIG. 1.

In the mobile terminal apparatus 1, the imaging processing portion 21 starts imaging processing using the image capturing device 15 in accordance with a user operation on the input device 13 (step S1). Thus, as shown in FIG. 5 for example, a captured image that is captured by the image capturing device 15 is displayed on the display device 12 in real time.

The operation information transmitting portion 22 monitors whether or not a predetermined user operation (such as a touch) on the captured image was detected by the input device 13 during display of the captured image. When the operation information transmitting portion 22 detects such a user operation at a certain point in time (step S2), the operation information transmitting portion 22 identifies a captured image (still image) at that point in time and a position of the user operation on the captured image, and extracts, from the captured image, a partial image of a specific range including the position as an operation partial image as shown in FIG. 6, for example (step S3). Then, the operation information transmitting portion 22 transmits operation partial image data indicating the operation partial image to the image forming apparatus 2 by means of the wireless communication device 11 (step S4). At this time, the operation information transmitting portion 22 presents the specific range on the captured image during display of the captured image. For example, the operation information transmitting portion 22 displays the captured image on the display device 12 by superimposing a frame image indicating the specific range on the captured image or changes the display mode (brightness, color, or the like) of the specific range on the captured image to present the specific range.

In the image forming apparatus 2, the remote operation processing portion 42 monitors whether or not operation partial image data has been received from the mobile terminal apparatus 1 by the communication device 37. When the operation partial image data is received, the remote operation processing portion 42 identifies an operation part corresponding to an operation partial image based on the received operation partial image data and operation part data 31a as described above (step S5).

When the remote operation processing portion 42 identifies an operation part on which a user operation has been indirectly performed in this manner, the remote operation processing portion 42 notifies the controller 41 that the operation part has been operated, and causes the controller 41 to execute an action corresponding to the operation (screen transition, execution of various kinds of processing (such as printing) using an internal device, or the like) (step S6). When an operation part corresponding to the operation partial image data is not detected, the operation partial image data is ignored.

As described above, according to the above embodiment, the mobile terminal apparatus 1 (a) captures an image of the operation panel 32 of the image forming apparatus 2 to generate a captured image, (b) displays the captured image, (c) detects a user operation on the captured image, (d) identifies a position of the user operation on the captured image, (e) extracts, from the captured image, a partial image of a specific range including the position on the captured image as an operation partial image, and (f) transmits operation partial image data indicating the operation partial image to the image forming apparatus 2. The image forming apparatus 2 (a) receives the operation partial image data from the mobile terminal apparatus 1, (b) identifies an operation part on the operation panel 32 corresponding to the operation partial image indicated by the operation partial image data, and (c) executes an action corresponding to the identified operation part.

Thus, since the mobile terminal apparatus 1 need not hold the layout data, the user can cause the image forming apparatus 2 to perform a desired operation by means of the mobile terminal apparatus 1 regardless of the model of the image forming apparatus 2. In addition, since the user can cause the image forming apparatus 2 to perform a desired operation by means of their own mobile terminal apparatus 1, the user need not touch the operation panel 32 of the image forming apparatus 2, and contact infection of infectious diseases caused by viruses or the like in recent years can be suppressed.

It is noted that various changes and modifications to the above embodiment are obvious to those skilled in the art. Such changes and modifications may be made without departing from the intent and scope of the subject matter without diminishing the intended advantages. That is, such changes and modifications are intended to be included in the scope of the claims.

For example, in the above-described embodiment, the remote operation program 14*a* may be stored in a portable computer-readable recording medium or server, read from the recording medium or server, installed in the mobile terminal apparatus 1, and stored in the storage device 14.

The present disclosure can be applied to, for example, an image forming apparatus.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:
a communication device capable of communicating with a mobile terminal apparatus of a user;
an internal device; and
a remote operation processing portion, wherein
the remote operation processing portion (a) receives operation partial image data from the mobile terminal apparatus by means of the communication device, (b) identifies an operation part on an operation panel corresponding to an operation partial image indicated by the operation partial image data, and (c) executes an action corresponding to the identified operation part by means of the internal device, and
the operation partial image data is image data indicating a partial image of a specific range including a detection position of a user operation on a captured image, the partial image being extracted from the captured image generated by the mobile terminal apparatus capturing an image of the operation panel of the image forming apparatus.

2. The image forming apparatus according to claim 1, further comprising a nonvolatile storage device, wherein
the storage device stores in advance operation part data indicating one or more operation parts on the operation panel of the image forming apparatus, and
the remote operation processing portion identifies the operation part corresponding to the operation partial image with reference to the operation part data.

* * * * *